May 8, 1956  E. P. MARKOWSKI ET AL  2,744,718
VIBRATION ISOLATOR

Filed Aug. 29, 1952  4 Sheets-Sheet 1

Inventors
Edwin P. Markowski
William W. Symonds
by Robert L. Thompson
att'y.

May 8, 1956 E. P. MARKOWSKI ET AL 2,744,718
VIBRATION ISOLATOR
Filed Aug. 29, 1952 4 Sheets-Sheet 2

Inventors
Edwin P. Markowski
William W. Symonds
by Robert L. Thompson
Att'y.

May 8, 1956  E. P. MARKOWSKI ET AL  2,744,718
VIBRATION ISOLATOR
Filed Aug. 29, 1952  4 Sheets-Sheet 4

Inventors
Edwin P. Markowski
William W. Symonds
by Robert L. Thompson
att'ys.

United States Patent Office 2,744,718
Patented May 8, 1956

2,744,718

VIBRATION ISOLATOR

Edwin P. Markowski, Dorchester, and William W. Symonds, Marblehead Neck, Mass., assignors to Barry Controls Incorporated, a corporation of Massachusetts Application August 29, 1952, Serial No. 307,004

5 Claims. (Cl. 248—358)

This application is a continuation in part of our application Serial No. 193,890, filed November 3, 1950, Patent No. 2,680,284.

Our invention relates to flexible mountings known as vibration isolators which are used to effect a reduction in the magnitude of vibration transmitted between structures which must be mechanically connected. In applications where the operation of machinery causes a vibrating force to be created within the machinery, isolators may be employed to reduce the magnitude of the force transmitted to the support for the machinery. In other applications, machinery or equipment is mounted upon a support which vibrates, and an isolator is employed to reduce the severity of vibration transmitted from the support to the equipment.

Isolators are used in aircraft for mounting delicate equipment. They protect the equipment from the vibration created by operation of the engine, by aerodynamic forces acting upon the aircraft structure, by gunfire of the plane's armament, and by taxiing, landing and taking off. The important elements of a vibration isolator for such applications are (1) a relatively compliant spring or other resilient element for carrying the weight of the equipment, (2) a snubber to cushion the equipment when it is moved a large distance from its neutral position and (3) a damper to reduce the duration of transient vibration of the mounted equipment.

An object of our invention is to provide a vibration isolator constructed entirely of materials whose operation and endurance are not adversely affected by the extremely high and extremely low temperatures sometimes encountered in aircraft operation.

Another object is to provide a vibration isolator which is equipped with an improved damper for subtracting energy from a vibrating system, thereby reducing the time during which the transient vibration exists.

A still further object of our invention is to include, with a vibration isolator, a damping means having an associated spring for insuring adequate functioning of the damper at vibration of relatively high frequencies and for preventing permanent deformation of the damping means.

Another object of our invention is to associate a damper and a spring in such a way as to prevent the damper from taking a permanent set. Many light shocks occur in aircraft service and metallic damping material tends to set upon repeated applications of force. The spring is so combined with the other elements of the assembly that it counteracts or resists this tendency.

A further object of the invention is to attach the metallic damper to both the upper and lower ends of the load carrying spring. The load carrying spring is relatively stiff, and thus tends to oppose compression set of the damper upon repeated occurrences of shock.

Another object of our invention is to provide such a vibration isolator equipped with a snubber or snubbers which cushion the mounted equipment after it has been displaced a certain distance in any direction.

Further objects will be apparent from consideration of the following description and the attached drawings in which.

Figure 1:
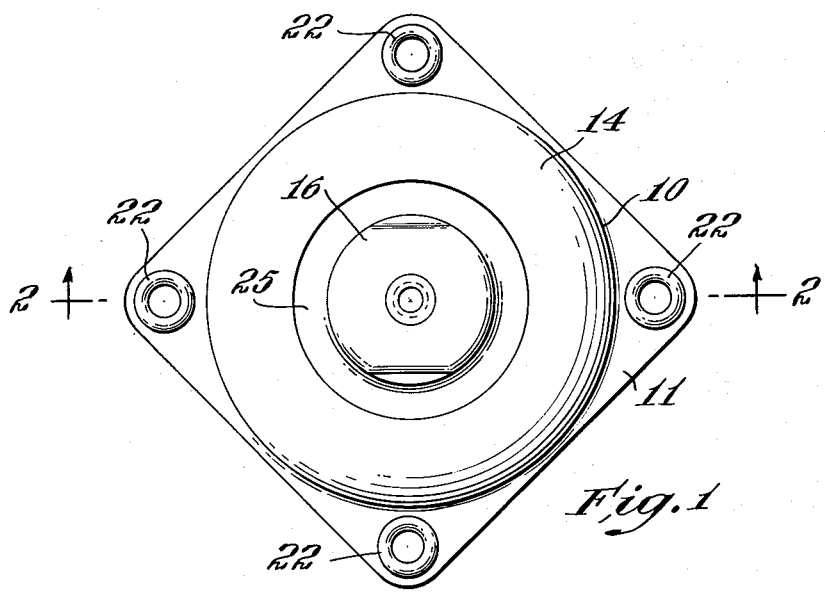
Fig. 1 is a plan view of an isolator showing one embodiment of our invention.
Figure 2:
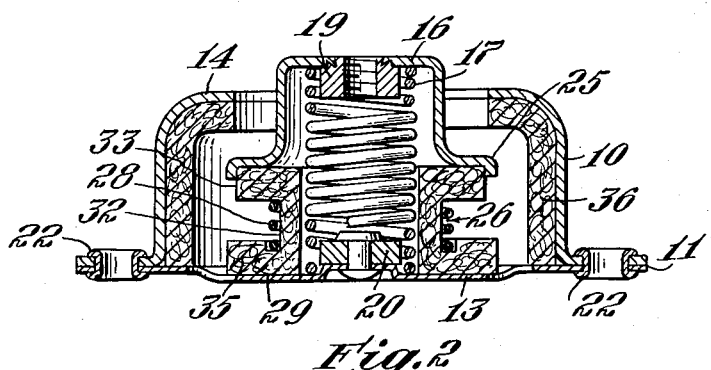
Fig. 2 is a section on line 2—2 of Fig. 1.
Figure 3:
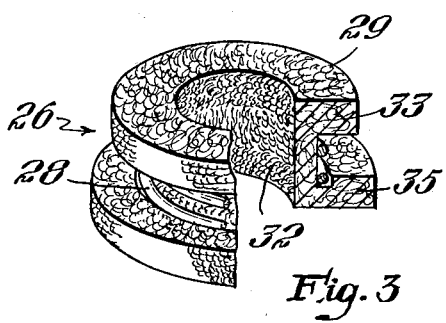
Fig. 3 is a partially cut away perspective view of the damper that forms a part of the isolator illustrated in Figs. 1 and 2.

The isolator shown in Figs. 1 to 3 of the drawings includes a substantially cylindrical housing 10 with a lower peripheral flange 11 to which a bottom plate 13 is secured by the eyelets 22. The upper wall 14 of the housing is provided with an opening through which one end of an inverted cup 16 is inserted. The main load supporting spring 17 extends between the bottom plate 13 and the inverted cup 16. The spring 17 is centered in the cup 16 by a tapped boss 19 swaged to the cup; at its bottom end by another boss 20 riveted to the bottom plate 13. The mounted equipment is attached to the isolator by a bolt which threads into the tapped boss 19, and the isolator is attached to the aircraft structure by means of bolts extending through the eyelets 22.

The inverted cup 16 is provided with a peripheral flange 25 on its lower edge. A compliant damper 26 is arranged to encircle the lower part of the spring 17 and is confined between the peripheral flange 25 and the bottom plate 13. The damper is thus compressed by downward vibratory movement of the mounted equipment, and is permitted to extend when the vibrating body moves upwardly. The embodiment of the damper 26 shown in Figs. 2 and 3 consists of the combination of a helical damper spring 28 and a body of compliant material 29 which may be formed, for example, by knitting corrosion resistant wire (for example, stainless steel) of small diameter. The knitted wire absorbs energy from the vibrating system as a result of the friction between the flexing strands of wire and as a result of the friction embodied in the rubbing of these wires on the coils of the spring 17.

The damper 26 is comprised of four principal parts. The central part 32 is substantially cylindrical in form and is made preferably of relatively loosely knitted wire which is free to deflect readily and thereby absorbs energy in friction from the vibrating system. The upper (33) and lower (35) parts are effectively flat washers, concentric with the center cylindrical part 32, and preferably formed integral therewith. The upper and lower parts are formed in such a manner that their density is substantially greater than that of the center cylindrical part 32. They engage to provide a cushioned stop which limits downward movement of the mounted equipment. An inverted cup 36 of resilient material, preferably knitted wire pressed to the shape of the housing 10, is provided to cushion or snub lateral and upward movement of the mounted equipment. The helical damper spring 28 surrounds the center cylindrical part 32 of the damper, and functions to assure that the damper follows the inverted cup in its upward and downward vibratory motion.

Figure 4:
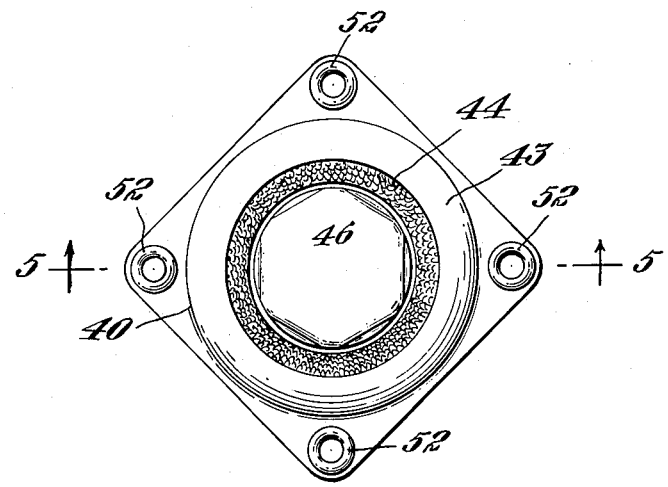
Fig. 4 is a plan view of an isolator showing another embodiment of our invention.
Figure 5:
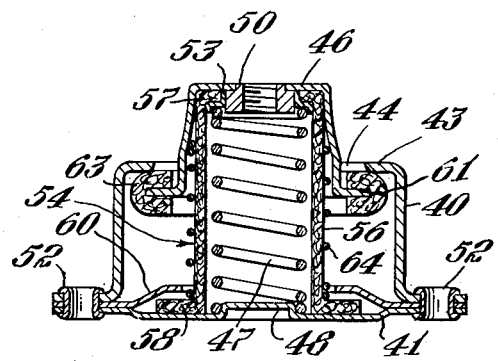
Fig. 5 is a section on line 5—5 of Fig. 4.

The isolator shown in Figs. 4 and 5 embodies a housing 40 and a base plate 41 generally similar to those shown in Figs. 1 and 2. The upper wall 43 of the housing is provided with an opening 44. An inverted cup 46 having a substantially hexagonal upper portion is inserted through the opening 44 in the housing 40. The main load supporting element, a coil spring 47 in this embodiment, extends downwardly from the top of the inverted cup 46 to the base plate 41. The load supporting element 47 is positioned at the bottom by an upwardly directed projection 48 on the base plate and extending inside the spring 47. A tapped boss 50 is secured to the inside of the inverted cup 46 and is used for attaching the mounted equipment to the isolator. The isolator, in turn, is attached to the airplane structure by screws inserted through the eyelets 52 at the base of the isolator.

The upper end of the main load supporting element 47 engages the horizontal part of a spring seat 53. The inner diameter of the spring seat 53 preferably fits the outer diameter of the tapped boss 50. The damper 54 is made of knitted metallic material similar to that used to construct the damper 26 of the isolator illustrated in Figs. 2 and 3. The loosely knitted central portion 56 of the damper 54 deflects readily and absorbs energy from the vibrating system as a result of friction between the wires of the damper. The upper (57) and lower (58) portions of the damper are tightly compressed to serve as anchors for the ends of the damper. The upper portion 57 is in the form of an inwardly turned peripheral rim that fits above the horizontal part of the spring seat 53. The lower portion 58 is an outwardly turned rim held against substantial movement relative to the base plate 41 by the anchor plate 60. The anchor plate 60 is interposed between the housing 40 and the base plate 41 and is secured by the eyelets 52.

The upper and lower portions of the damper 54 are constrained to follow the upper and lower ends of the resilient load supporting element 47 for any motion resulting from vibration or shock. The housing 40 and the base plate 41 are secured rigidly to the aircraft structure. The inverted cup 46 moves relatively to the housing when the mounted equipment partakes of motion within the aircraft as a result of vibration and shock. Flexing of the loosely knitted central portion 56 of the damper 54 is thus assured because the damper is attached at its upper and lower ends to the upper and lower ends of the main load supporting element 47. The load supporting element 47 is relatively stiff to enable it to support the weight of the mounted equipment. The main load supporting element tends to extend the damper 54 and thereby overcome any tendency to receive a permanent set as a result of repeated flexing.

The inverted cup 46 is provided with a peripheral flange 61. The flange 61 is covered with resilient covering 63 which may be made of knitted wire, rubber, or other suitable material. The covering 63 engages the side of the housing 40 to limit and cushion motion of the mounted equipment in the horizontal direction; it engages the inner side of the upper wall 43 of the housing 40 to limit upward motion of the mounted equipment; and it engages the anchor plate 60 to limit the downward motion of the mounted equipment. A light spring 64 encircles the loosely knitted central part 56 of the damper 54 to prevent outward bulging of the damper with consequent possible damage by having it caught between the peripheral flange 61 and the anchor plate 60.

Figure 6:
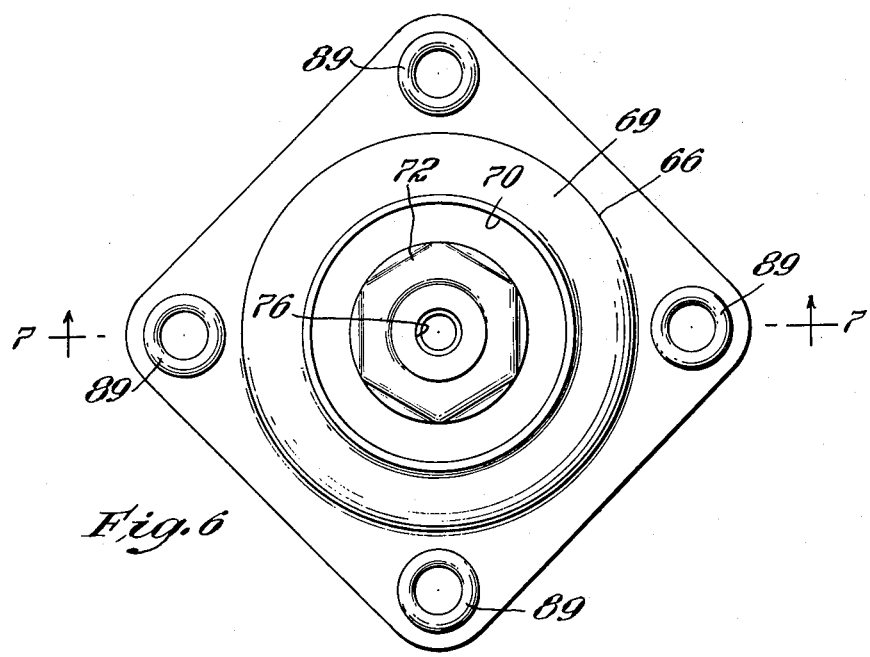
Fig. 6 is a plan view of an isolator showing another embodiment of our invention.
Figure 7:
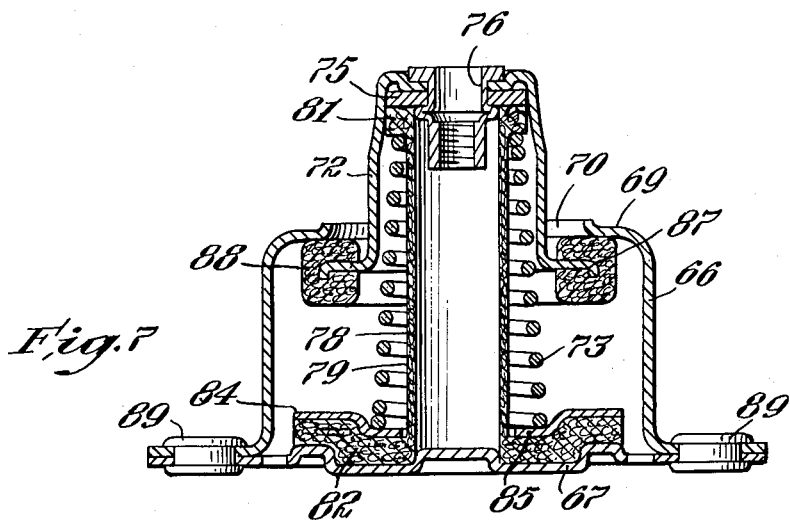
Fig. 7 is a section on line 7—7 of Fig. 6.

The isolator shown in Figs. 6 and 7 employs a housing 66 and base plate 67 generally similar to that used in the isolator of Figs. 4 and 5. The upper wall 69 of the housing 66 is provided with an opening 70. An inverted cup 72 having a hexagonal upper portion extends through the opening 70 in the wall of the housing 66. The main load carrying element, a coil spring 73, extends from the lower part of the isolator to within the inverted cup 72. The opposite ends of the main load carrying element 73 engage spring seats to be hereinafter described. A washer 75 is riveted to the inside of the inverted cup 72 by a special rivet 76 having a threaded portion for attachment of the mounted equipment. The upper side of the inverted cup is dimpled to accommodate the head of the special rivet.

The damper 78 embodies a loosely knitted central part 79 made of material similar to that used to construct the damper 26 of the isolator shown in Figs. 2 and 3. The loosely knitted central part 78 of the damper is located inside the coil spring 73 that constitutes the main load carrying element. The upper part of the damper is a tightly compressed outwardly turned peripheral ring 81 interposed between the washer 75 and the upper end of the coil spring 73. The lower part of the damper is an outwardly turned peripheral rim 82 nesting in the convolutions of the base plate 67. The lower spring seat is in the form of a washer 84 that overlies the lower rim 82 of the damper, and is provided with a central dimple 85 that functions to locate the lower end of the main load supporting element 73. The spring seat 84 is held down by the weight of the mounted equipment, and thereby serves to hold the lower end of the damper 78 against the base plate 67. The damper is thus constrained at the top and bottom to follow the movement of the upper and lower ends of the main load carrying element 73, and the damper is prevented from taking a permanent set for reasons pointed out above.

The inverted cup 72 is provided with a peripheral flange 87 similar to the flange shown in Figs. 4 and 5. The flange is covered with a suitable resilient material 88 such as knitted wire, rubber or other material, and engages the side of the housing 66 to limit and cushion movement of the mounted equipment in a horizontal direction. Upward motion of the mounted equipment is limited by engagement of the resilient cover 88 with the top of the housing 66, and downward movement is limited by engagement of the resilient cover 88 with the lower spring seat 84.

The special rivet 76, as associated with the inverted cup 72 illustrated in Fig. 7, can be adapted to the design of the isolator shown in Figs. 4 and 5.

The base plate 67 and housing 66 are secured together by the eyelets 89 and the isolator is attached to the aircraft or other supporting structure by screws inserted through these eyelets.

Figure 8:
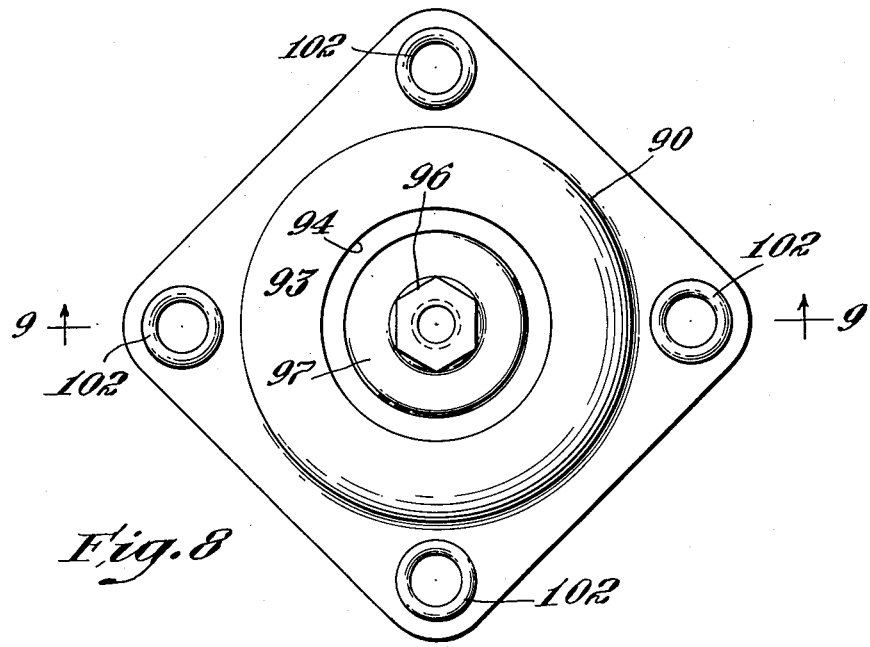
Fig. 8 is a plan view of an isolator showing a still further embodiment of our invention.
Figure 9:
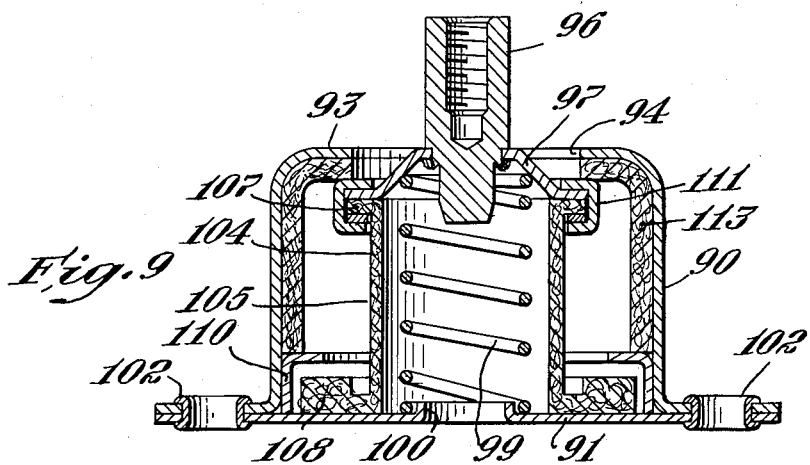
Fig. 9 is a section on line 9—9 of Fig. 8.

In the embodiment shown in Figs. 8 and 9, the isolator is comprised of a housing 90 and a base plate 91 similar to that shown in Figs. 1 and 2. The upper wall 93 of the housing 90 is provided with a central opening 94. A central tapped core 96 extends upwardly through this opening and is adapted for attachment of the mounted equipment. The core 96 has rigidly attached thereto an inverted cup formed by the dome-shaped washer 97 whose outer diameter is greater than the diameter of the opening 94 in the upper wall 93 of the housing 90. The main load carrying element, a coil spring 99, seats against the dome-shaped washer 97, and its lower end is located by the flange 100 around the central hole in the base plate 91. The base plate 91 and the housing 90 are secured together by eyelets 102, and the isolator is attached to the aircraft structure by screws inserted through these eyelets.

The damper 104 is constructed from knitted stainless steel wire in the form described in connection with the isolator illustrated in Figs. 1 and 2. The central portion 105 of the damper 104 remains loosely knitted so that energy is absorbed from the vibrating system by flexing of the loose central portion of the damper. The upper (107) and lower (108) portions of the damper 104 are in the form of tightly compressed, outwardly directed rims. The lower rim 108 is held closely adjacent the base plate 91 by the inverted shallow cup 110. The upper rim 107 of the damper is attached to the underside of the dome-shaped washer 97 adjacent its periphery by the retainer 111 whose cross-section is an inwardly facing channel that envelopes the periphery of the dome-shaped washer 97 and the upper rim 107 of the damper. The housing 90 is provided with a liner 113 of knitted wire or other suitable resilient material for engagement with the retainer 111 upon excessive lateral displacement of the mounted equipment.

While four embodiments of our invention have been shown and described, it will be understood that many changes and modifications may be made therein without departing from the spirit and scope of the invention as defined in the appended claims.

We claim:

1. A vibration isolator comprising a base member adapted for attachment to a supporting member, a load attachment member above said base member and adapted for attachment to a load which is to be supported, an elongate one-piece damper formed of interlocked flexible wires and extending between the base member and a portion of the load attachment member, said damper having a relatively loosely formed portion intermediate its ends, a first lateral projection integral with and adjacent to one end of said damper and formed of tightly compressed interlocked wires, a second lateral projection integral with and adjacent to the other end of said damper and formed of tightly compressed interlocked wires, each of said lateral projections being of substantially greater density than said loosely formed intermediate portion, and means for moving one lateral projection with the load attachment member and relative to the other lateral projection, said means including a main resilient load supporting element which extends longitudinally of said damper, whereby damping is accomplished by the rubbing upon each other of the interlocked wires of said loosely formed intermediate portion caused by such movements of said one lateral projection relative to said other lateral projection and permanent deformation of the loosely formed intermediate portion of the damper is prevented.

2. An isolator according to claim 1 wherein the loosely formed intermediate portion is tubular.

3. An isolator according to claim 1 wherein the first lateral projection is located between one end of the main resilient load supporting element and a portion of the load attachment member.

4. An isolator according to claim 1 wherein the means for moving one lateral projection with the load attachment member and relative to the other lateral projection includes a helical compression spring which encircles said loosely formed intermediate portion of the damper, the lower end of said spring acting to hold the second lateral projection substantially immovable relative to the base member and the upper end of said spring being deflected downwardly by downward movement of said load attachment member.

5. An isolator according to claim 1 wherein said means for moving one lateral projection with the load attachment member and relative to the other lateral projection includes a clip which is U-shaped in cross section and which clamps the first lateral projection to a flange of the load attachment member.

References Cited in the file of this patent

UNITED STATES PATENTS

| | | |
|---|---|---|
| 93,984 | Gardiner | Aug. 24, 1869 |
| 1,506,557 | Bird | Aug. 26, 1924 |
| 1,866,274 | Stroller | July 5, 1932 |
| 1,936,389 | Hallquist | Nov. 21, 1933 |
| 2,044,649 | Swennes | June 16, 1936 |
| 2,334,263 | Hartwell | Nov. 16, 1943 |
| 2,398,595 | Powell | Apr. 16, 1946 |
| 2,462,316 | Goodloe | Feb. 22, 1949 |
| 2,519,702 | Robinson | Aug. 22, 1950 |
| 2,520,442 | Schwartz | Aug. 29, 1950 |
| 2,658,710 | Titus | Nov. 10, 1953 |
| 2,687,269 | Titus et al. | Aug. 24, 1954 |
| 2,687,270 | Robinson | Aug. 24, 1954 |